United States Patent
Xue et al.

(10) Patent No.: US 11,564,084 B2
(45) Date of Patent: Jan. 24, 2023

(54) INFORMATION TRANSMISSION METHOD, DEVICE, AND COMPUTER READABLE STORAGE MEDIUM

(71) Applicant: ZTE CORPORATION, Shenzhen (CN)

(72) Inventors: Yan Xue, Shenzhen (CN); Guanghui Yu, Shenzhen (CN); Feng Xie, Shenzhen (CN); Qiang Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 48 days.

(21) Appl. No.: 17/262,666

(22) PCT Filed: Apr. 12, 2019

(86) PCT No.: PCT/CN2019/082486
§ 371 (c)(1),
(2) Date: Jan. 22, 2021

(87) PCT Pub. No.: WO2020/019764
PCT Pub. Date: Jan. 30, 2020

(65) Prior Publication Data
US 2021/0306844 A1   Sep. 30, 2021

(30) Foreign Application Priority Data
Jul. 24, 2018   (CN) .......................... 201810820564.8

(51) Int. Cl.
*H04W 8/24* (2009.01)
*H04W 76/11* (2018.01)
(Continued)

(52) U.S. Cl.
CPC ............. *H04W 8/245* (2013.01); *H04W 8/20* (2013.01); *H04W 76/11* (2018.02); *H04W 92/20* (2013.01)

(58) Field of Classification Search
CPC ....... H04W 8/245; H04W 76/11; H04W 8/20; H04W 92/20
(Continued)

(56) References Cited

U.S. PATENT DOCUMENTS 9,496,944 B2 * 11/2016 Pitakdumrongkija ....................... H04B 7/15507
2015/0264637 A1   9/2015 Zaus et al.
(Continued)

FOREIGN PATENT DOCUMENTS

| CN | 105210345 A | 12/2015 |
|---|---|---|
| CN | 107018534 A | 8/2017 |

(Continued)

OTHER PUBLICATIONS

Chinese Office Action for Application No. 201810820564.8, dated Jul. 21, 2021, 17 pages including translation.
(Continued)

*Primary Examiner* — Nghi H Ly
(74) *Attorney, Agent, or Firm* — Morgan, Lewis & Bockius LLP (57) ABSTRACT

Disclosed are an information transmission method and device, and a computer readable storage medium. The method comprises: an edge node sends a radio capability exposure request to a target transmission node at a radio access network side; the edge node receives radio capability exposure response information responded by the target transmission node. Specifically, the edge node sends the radio capability exposure request to the target transmission node at the radio access network side by means of an Xm
(Continued)

interface, and receives the radio capability exposure response information responded by the target transmission node by means of the Xm interface or User Plane Functionality (UPF). In the solution of the present invention, the edge node can directly send the radio capability exposure request to the target transmission node at the radio access network side, and the target transmission node can also directly send the capability exposure response information to the edge node without the need of a core network, and thus better solving the problems in the related art that an information transfer delay exists in a radio capability exposure mode and the burden of core network processing is increased.

17 Claims, 4 Drawing Sheets

(51) Int. Cl.
  *H04W 8/20* (2009.01)
  *H04W 92/20* (2009.01)
(58) Field of Classification Search
  USPC ............... 370/329, 328, 338, 341, 345, 350
  See application file for complete search history.

(56) References Cited

U.S. PATENT DOCUMENTS

2017/0048876 A1 2/2017 Mahindra et al.
2018/0041954 A1 2/2018 Tamura
2020/0296749 A1* 9/2020 Freda ............... H04W 28/0268

FOREIGN PATENT DOCUMENTS

| CN | 108029053 A | 5/2018 |
| WO | WO-2014000611 A1 | 1/2014 |
| WO | WO-2017099165 A1 | 6/2017 |
| WO | WO-2018031070 A1 | 2/2018 |

OTHER PUBLICATIONS

International Search Report for Application No. PCT/CN2019/082486, dated Jul. 1, 2019, 4 pages.
Extended European Search Report for Application No. PCT/CN2019082486, dated Mar. 14, 2022, 9 pages.
He et al., Proposed New WI-Recommendation Y.dev-IoT-arch "Functional Architecture of Radio Network Capability Exposure Between RAN and Edge Computing Platform in Smart Hospital of Cellurar IoT," International Telecommunication Union, May 6-16, 2018, 12 pages, SG20, TD777-R1, Cairo Egypt.
Indian Office Action for Application No. 202127007811, dated Jan. 31, 2022, 5 pages.
Korean Office Action for Application No. 10-2021-7005358, dated Feb. 23, 2022, 10 pages (includes translation).
Samsung Electronics Co., Ltd., "RAML for xMBMS," Oct. 24-28, 2016, 2 pages, 3GPP SA4 #91, Bangalore, India.

* cited by examiner

INFORMATION TRANSMISSION METHOD, DEVICE, AND COMPUTER READABLE STORAGE MEDIUM

CROSS-REFERENCES TO RELATED APPLICATIONS

This is a National Stage Application, filed under 35 U.S.C. 371, of International Patent Application No. PCT/CN2019/082486, filed on Apr. 12, 2019, which is based on and claims priority to Chinese Patent Application No. 201810820564.8 filed on Jul. 24, 2018, the disclosure of which is incorporated herein by reference in its entirety.

TECHNICAL FIELD

The present disclosure relates to the field of communications and, in particular, to an information transmission method, a device, and a computer-readable storage medium.

BACKGROUND

In order to effectively satisfy the requirements for high bandwidth and low delay of the rapid development of the mobile Internet and the Internet of Things and to reduce the network load, the European Telecommunications Standards Institute (ETSI) proposed the concept of mobile edge computing (MEC) in 2014. The MEC technology provides the capability of IT and cloud computing for the radio access network mainly by deploying a universal server at the radio access side, so the MEC can also be referred to as the edge cloud. In 2017, in order to better support 3rd Generation Partnership Project (3GPP) and non-3GPP systems, the ETSI renamed the MEC from Mobile Edge Computing to Multi-access Edge Computing.

In the next-generation network architecture research project (TR23.799, TR: Technical Report) and the 5th Generation fifth generation mobile communication technology (5G) system architecture standard (TS23.501, TS: Technical Specification), the 3GPP has defined that the MEC is the main target of the 5G network architecture. The 5G network architecture standard research of the 3GPP focuses on the requirements of the 5G network service and the evolution trend of the architecture and aims to achieve the objectives of the MEC through user plane distributed sinking and flexible routing.

The MEC platform can integrate the 5G user plane function (UPF) to implement data forwarding for a service flow, and can also implement cross-layer information interaction and joint optimization between the radio side and the application layer by means of radio information exposure. Since the MEC is located at the edge of the network, closer to the radio network and the user, the MEC naturally has the advantage that the MEC can easily sense and utilize the network context information and easily obtain real-time radio network information. If the exposure interface transfers such information to a third-party application, the user experience can be improved, the service can be optimized, both the network and the service can be satisfied, and the deep convergence of the network and the service can be promoted, thereby creating more business opportunities. The combination of MEC and 5G architectures in the capability exposure is a key factor in the landing of MEC technology.

Figure 1:
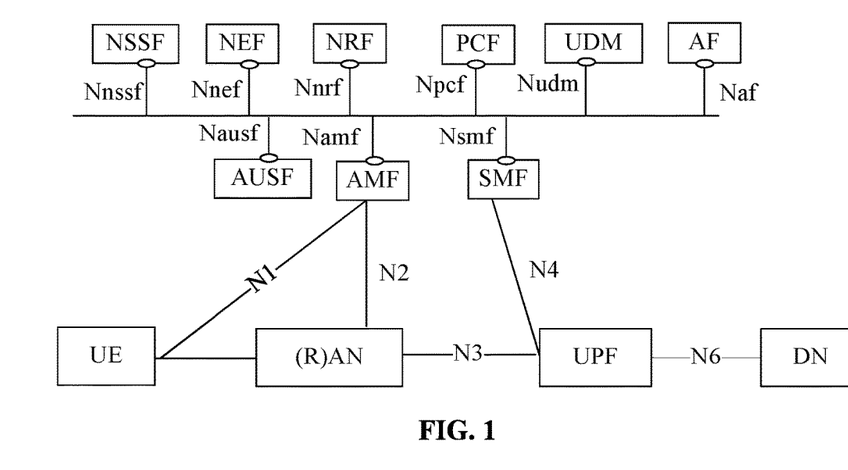
FIG. 1 is a schematic diagram of an architecture of a 5G network.

The 5G system architecture standard, 3GPP TS23.501, has determined a service-based network architecture (SBA) and defined the network, application function (AF), and network exposure function (NEF) which are used for the exposure of radio network capabilities. The NEF collects network capabilities including policy control capability and communicates with applications through the MEC platform. The NEF is a network function of a core network (CN) and needs to perform capability exposure through the 5G CN. FIG. 1 illustrates a service-based 5G system architecture defined by 3GPP in TS23.501. In the system architecture, the user equipment (UE) and the radio access network (RAN) node belong to the radio access side network function. DN refers to the data network, and UPF is the user plane functionality of a core network and can sink to the RAN side and connect to a local data network. Other network functions belong to the core network function. The network logic functional network elements of these core networks specifically are: session management functionality (SMF) which is responsible for session access and management, including UPF selection/reselection; access and mobility management function (AMF) which responsible for UE access and mobility management; authentication server function (AUSF) which is responsible for UE authentication; network repository function (NRF) which is responsible for establishing network function mutual discovery; policy control function (PCF) is responsible for policy rules of the control plane; unified data management (UDM) which is responsible for information management such as user ID management; network exposure function (NEF) which is responsible for network capability exposure; application function (AF) which is responsible for App control and deployment and may be either operator trusted domain or third-party untrusted domain. The AF of the trusted domain can directly access corresponding functions in the network while the AF of the non-trusted domain may access the network after passing through the NEF. In the architecture shown in FIG. 1, the radio network information needs to be sent to the core network and exposed to applications through the NEF.

Since the information provision of the RAN is not based on the service architecture, it cannot be used directly for the MEC. The exposure of radio network capabilities in the current 5G system architecture requires that the radio information is first transmitted to the core network and then transferred to the MEC by the core network. This means that even if the MEC is closer to the radio network and the user in terms of location deployment, the radio network information must first detour to the core network and then becomes available to the MEC. According to this mechanism, regardless of whether the core network needs RAN-side information, when the MEC needs the exposure of such information, the information must also be transferred and processed in the core network. Some low-delay scenarios such as the Industrial Internet, Internet of Vehicles and the like have extremely severe requirements for the delay of the radio information. Moreover, the radio information on the RAN side is numerous and disorder, and the use of the current network capability exposure mechanism not only increases the delay of information transfer but also increases the processing burden of the core network.

SUMMARY

Embodiments of the present disclosure provide an information transmission method and apparatus, and a computer-readable storage medium, so as to solve the problem that the delay of information transfer of the radio network capability manner is increased and the processing burden of the core network is increased in the related art.

In one aspect, the embodiments of the present disclosure provide an information transmission method. The method includes the steps described below.

An edge node sends a radio capability exposure request to a target transmission node at a radio access network side.

The edge node receives radio capability exposure response information returned by the target transmission node.

In another aspect, the embodiments of the present disclosure provide an information transmission method. The method includes the steps described below.

A transmission node at a radio access network side receives a radio capability exposure request sent by an edge node.

The transmission node returns radio capability exposure response information to the edge node.

In a third aspect, the embodiments of the present disclosure provide an information transmission apparatus. The apparatus is applied to an edge node and includes a request module and a receiving module.

The request module is configured to send a radio capability exposure request to a target transmission node at a radio access network side.

The receiving module is configured to receive radio capability exposure response information returned by the target transmission node.

In a fourth aspect, the embodiments of the present disclosure provide an information transmission apparatus. The apparatus is applied to a target transmission node at a radio access network side and includes a request receiving module and a response module.

The request receiving module is configured to receive a radio capability exposure request sent by an edge node.

The response module is configured to return radio capability exposure response information to the edge node.

In a fifth aspect, the embodiments of the present disclosure provide an edge node device. The edge node device includes a memory, a processor, and a computer program stored in the memory and executable by the processor, where the computer program, when executed by the processor, implements the steps described below.

A radio capability exposure request is sent to a target transmission node at a radio access network side.

Radio capability exposure response information returned by the target transmission node is received.

In a sixth aspect, the embodiments of the present disclosure provide a transmission node device. The transmission node device includes a memory, a processor, and a computer program stored in the memory and executable by the processor, where the computer program, when executed by the processor, implements the steps described below.

A radio capability exposure request sent by an edge node is received.

Radio capability exposure response information is returned to the edge node.

In a seventh aspect, the embodiments of the present disclosure provide a computer-readable storage medium. The computer-readable storage medium stores a computer program. The computer program, when executed by a processor, implements steps of the information transmission method applied to the edge node described above, or the computer program, when executed by the processor, implements steps of the information transmission method applied to the transmission node described above.

Through the method of the embodiments of the present disclosure, the edge node can directly send the radio capability exposure request to the target transmission node at node at the radio access network side, and the target transmission node can also directly send the capability exposure response information to the edge node without the need for a core network, thereby solving the problems that the information transfer delay of the radio capability exposure manner is increased and the burden of core network processing is increased in the related art.

The above description is only an overview of the solutions of the present disclosure. In order to better understand the technical means of the present disclosure, the present disclosure may be implemented in accordance with the content of the description. The above and other objects, features, and advantages of the present disclosure will be more apparent from specific embodiments of the present disclosure described below.

BRIEF DESCRIPTION OF DRAWINGS

Various other advantages and benefits will become apparent to those of ordinary skill in the art after the detailed description of the preferred embodiments described below is read. The drawings are merely for the purpose of illustrating the preferred embodiments and are not to be construed as limiting the present disclosure. Furthermore, like reference numerals refer to like parts throughout the drawings. In the drawings.

DETAILED DESCRIPTION

Exemplary embodiments of the present disclosure will be described in detail with reference to the drawings. The drawings illustrate the exemplary embodiments of the present disclosure, but it should be understood that the present disclosure may be implemented in various ways and should not be limited to the embodiments set forth herein. On the contrary, these embodiments are provided for a thorough understanding of the present disclosure and to fully convey the scope of the present disclosure to those skilled in the art.

Figure 2:
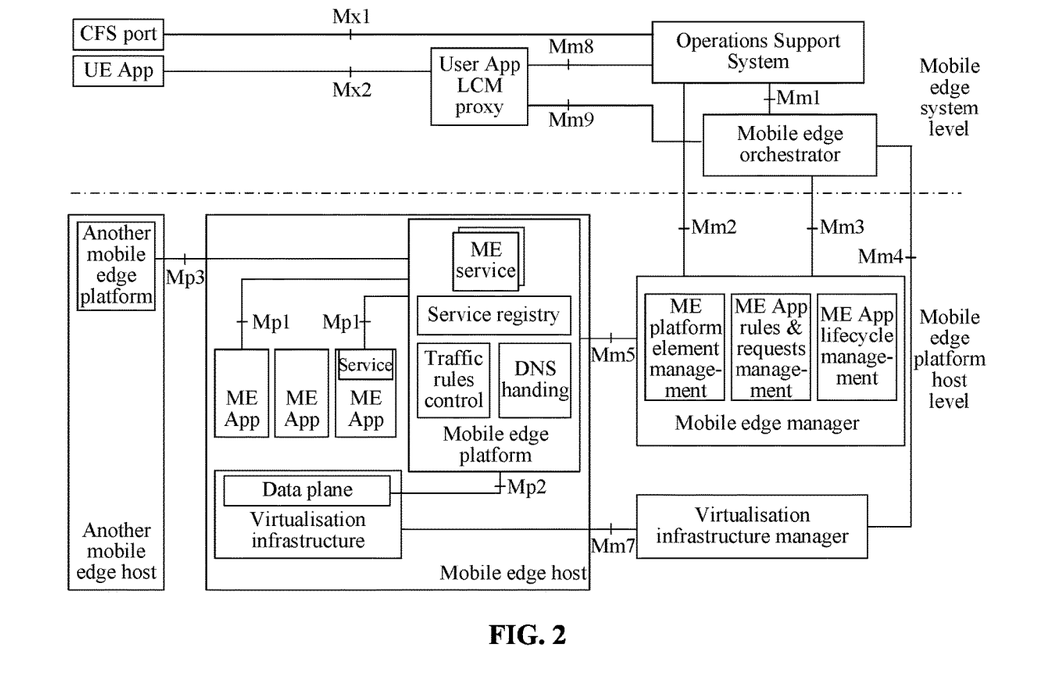
FIG. 2 is a schematic diagram of a system architecture of an ETSI MEC.

Before the description of the embodiments of the disclosure, the system architecture of the MEC in the ETSI will be described. As shown in FIG. 2, in the system architecture of the MEC, the mobile edge orchestrator is responsible for selecting mobile edge hosts, loading applications, and triggering application instance initialization and termination, the operations support system is responsible for authorizing requests of the UE and the third-party customer and transferring these requests to the mobile edge orchestrator and is also responsible for operations and maintenance. The user application lifecycle management proxy (user App LCM proxy) is configured to allow the operations of the UE such as instance loading and instance termination and informs the UE of the operation status of application instances corresponding to the UE. The customer facing service portal (CFS portal) is configured to allow the third party customer to select and subscribe a set of mobile edge applications, the mobile edge manager is configured to manage the application lifecycle and application rules and requirements, and receive error reports and measurements for virtualisation infrastructure. The virtualisation infrastructure manager is responsible for virtualisation infrastructure manager allocating, managing and releasing virtualisation resources and collecting and reporting virtualisation resource performance and error information. The mobile edge host includes the mobile edge platform and the virtualisation infrastructure which is configured to provide computing, storage, and network resources of the mobile edge applications. The mobile edge platform is configured to collect the necessary operation information of mobile edge applications and provide mobile edge services, the mobile edge application is an application instantiated on the mobile edge host based on the virtualisation infrastructure, and the user equipment application is configured to interact with the mobile edge computing platform through the user App LCM proxy.

In the embodiments of the present disclosure, in order to solve the problems that a large information transfer delay exists in a radio capability exposure manner and the burden of core network processing is increased in the related art, the embodiments of the present disclosure provide an information transmission method and apparatus, a device, and a computer-readable storage medium. The implementation of the present disclosure will be described in detail below through several specific embodiments.

Figure 3:
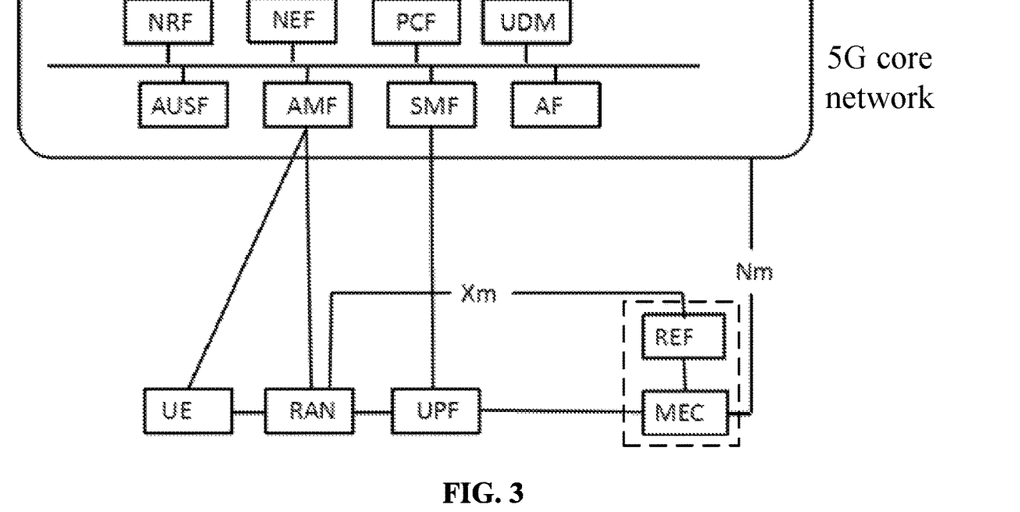
FIG. 3 is a schematic diagram of a system architecture of an edge node according to an embodiment of the present disclosure.

In a first embodiment of the present disclosure, an information transmission method is provided. The method is applied to an edge node, where the edge node may be a MEC system, a MEC host or a MEC platform. The diagram of the system architecture where the edge node is located is shown in FIG. 3. In FIG. 3, MEC represents the edge node, and RAN represents a transmission node of a radio access network side whose capabilities are requested to be exposed, where the transmission node may be a radio access node or a radio centralized control unit (CU), the radio access node may be a conventional or new radio access system base station and transmission node, the convention base station may be a 3GPP base station or an LTE base station, and the new base station may be a 5G base station or a 5G+ base station.

Figure 4:
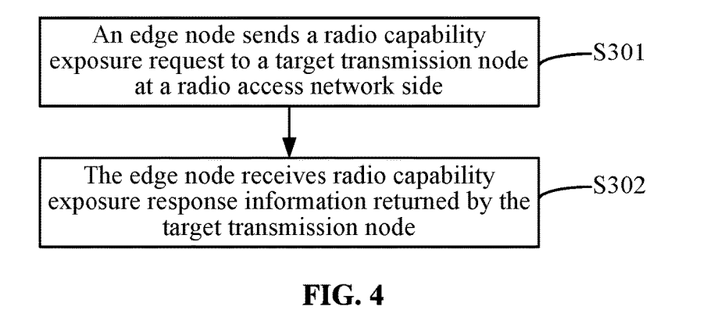
FIG. 4 is a flowchart of an information transmission method according to a first embodiment of the present disclosure.

As shown in FIG. 4, the method in this embodiment specifically includes the following steps.

In step S301, an edge node sends a radio capability exposure request to a target transmission node at a radio access network side.

In an optional embodiment of the present disclosure, the edge node sends the radio capability exposure request to the target transmission node at the radio access network side through an Xm interface.

In another embodiment of the present disclosure, the edge node sends the radio capability exposure request to the target transmission node at the radio access network side through a core network.

Optionally, in this embodiment of the present disclosure, the edge node may carry the radio capability exposure request when sending a connection setup request to the target transmission node at the radio access network side, or may also separately send the radio capability exposure request after setting up a connection with the target transmission node.

In step S302, the edge node receives radio capability exposure response information returned by the target transmission node.

In an optional embodiment of the present disclosure, the edge node receives the radio capability exposure response information returned by the target transmission node through an Xm interface.

It can be seen that in the method of this embodiment of the present disclosure, the edge node can directly send the radio capability exposure request to the target transmission node at node at the radio access network side and receives the radio capability exposure response information without the need for a core network, and the target transmission node can directly send the capability exposure response information to the edge node, thereby solving the problems that a large information transfer delay exists in the radio capability exposure manner and the burden of core network processing is increased in the related art.

In a second embodiment of the present disclosure, an information method is provided. This embodiment is basically the same as the first embodiment, but the difference between them is that the edge node receives the radio capability exposure response information in different manners. As shown in FIG. 4, the method in this embodiment includes the following steps.

In step S301, an edge node sends a radio capability exposure request to a target transmission node at a radio access network side.

In step S302, the edge node receives radio capability exposure response information returned by the target transmission node.

In this embodiment of the present disclosure, the manner in which the edge node receives the radio capability exposure response information returned by the target transmission node includes the following manners.

In manner one, the edge node receives the radio capability exposure response information returned by the target transmission node through a radio capability exposure network element (REF), where the REF is configured to convert radio information in the received radio capability exposure response information into an information format supported by the edge node.

Specifically, in this embodiment, the radio information on the RAN side is directly sent to the REF through an Xm interface, the REF converts the received information into a service-based application programming interface (API) and provided for the MEC.

The REF may a network function independent of the edge node, or may an API module located on the edge node.

In manner two, the edge node receives the radio capability exposure response information returned by the target transmission node through a UPF sunk near the radio access network.

Through the method in this embodiment of the present disclosure, the edge node can directly send the radio capability exposure request to the target transmission node at the radio access network side through the Xm interface and receives the radio capability exposure response information without the need for a remote core network, and the target transmission node can directly send the capability exposure response information to the edge node, thereby solving the problems that a large information transfer delay exists in the radio capability exposure manner and the burden of core network processing is increased in the related art.

Figure 5:
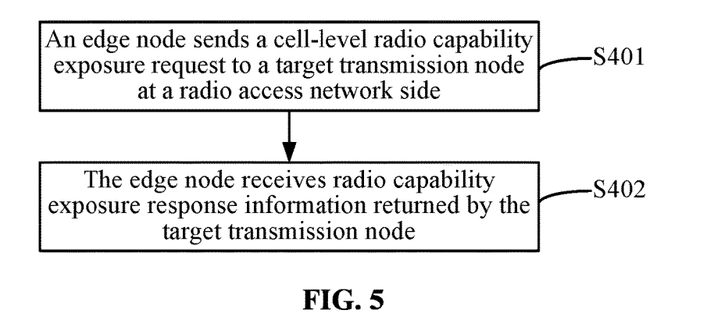
FIG. 5 is a flowchart of an information transmission method according to a third embodiment of the present disclosure.

In a third embodiment of the present disclosure, an information transmission method is provided. As shown in FIG. 5, the method in this embodiment includes the following steps.

In step S401, an edge node sends a cell-level radio capability exposure request to a target transmission node at a radio access network side.

The cell-level radio capability exposure request includes one or more of the following information: a mobile edge host ID, a target transmission node ID, a cell ID, an information category of requested cell-level radio information, an information name of requested cell-level radio information, a requested cell-level radio information response triggering method, or a period of a requested cell-level radio information response.

In this embodiment, the information category includes one or more of the following categories: identity information, system configuration information, system state information, measurement information, bearer information, or trigger event information.

In this embodiment, the radio information response triggering method refers to a triggering method of the radio information which the target transmission node provides for the edge node. In this embodiment, the request sent by the edge node to the target transmission node may include, for example, a triggering request response using a subscription or notification to implement the reservation to the radio information of the target transmission node. For example, when a specific event occurs at the target transmission node, the radio information transfer is automatically triggered or some radio information is sent periodically. The subscription and notification may be at the cell level, based on one user, or based on a group of users.

In step S402, the edge node receives radio capability exposure response information returned by the target transmission node.

The radio capability exposure response information includes one or more of the following information: a mobile edge host ID, a cell ID, an information category of cell-level radio information, or cell-level radio information.

The specific implementation process of this embodiment will be described in detail below through a specific example.

The radio network information service RNIS (Radio Network Information Service) in the mobile edge system initiates a service call to the mobile edge host MEC host, the mobile edge host determines the RAN side target node (which may be a base station ID and or a RAN CU ID) based on the service call information, initiates a request for RAN side capability open request to the target node, said request including one or more of the following information: a mobile edge host ID, a target node ID, a cell ID, a requested cell-level radio information category, an information name of cell-level radio information, a requested cell-level radio information response triggering method, or a period of a requested cell-level radio information response.

The request is sent to the target node at the RAN side through the Xm interface, and the target node at the RAN side receives the message request and initiates a message response to the mobile edge host. The response message includes a mobile edge host ID, a cell ID, an information category for cell-level radio information, and/or cell-level radio information.

The response message is sent through the Xm interface or UPF to the mobile edge host or to an edge host whose ID is included in the request message. That is, the target node at the RAN side may send a response message to the mobile edge host that initiated the request or may send a response message to a mobile edge host corresponding to the ID of a host (which may be different from the host that initiated the request) carried in the request.

Figure 6:
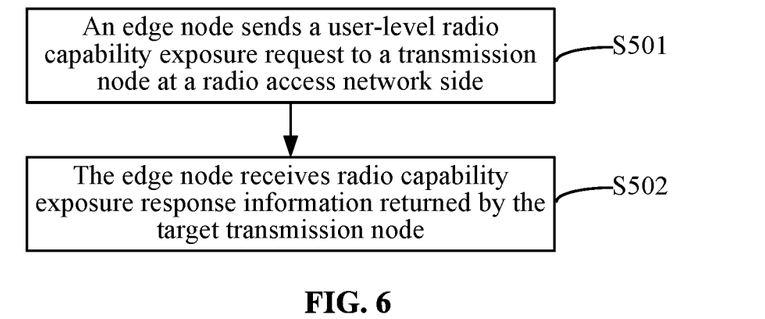
FIG. 6 is a flowchart of an information transmission method according to a fourth embodiment of the present disclosure.

In a fourth embodiment of the present disclosure, an information transmission method is provided. As shown in FIG. 6, the method in this embodiment includes the following steps.

In step S501, an edge node sends a user-level radio capability exposure request to a transmission node at a radio access network side.

The user-level radio capability exposure request includes one or more of the following information: a mobile edge host ID, a target transmission node ID, a common identity of a radio network information service object, an information category of requested user-level radio information, an information name of requested user-level radio information, a requested user-level radio information response triggering method, or a period of a requested user-level radio information response.

In this embodiment, the information category includes one or more of the following categories: identity information, system configuration information, system state information, measurement information, bearer information, or trigger event information.

In this embodiment, the radio information response triggering method refers to a triggering method of the radio information which the target transmission node provides for the edge node. In this embodiment, the request sent by the edge node to the target transmission node may include, for example, a triggering request response using a subscription or notification to implement the reservation to the radio information of the target transmission node. For example, when a specific event occurs at the target transmission node, the radio information transfer is automatically triggered or some radio information is sent periodically. The subscription and notification may be based on one user or a group of users.

In step S502, the edge node receives radio capability exposure response information returned by the target transmission node.

The radio capability exposure response information includes one or more of the following information: a mobile edge host ID, a target transmission node ID, a common identity of a radio network information service object, an information category of user-level radio information, or user-level radio information.

In an optional embodiment of the present disclosure, before the edge node sends the radio capability exposure request to the target transmission node at node at the radio access network side, the method further includes the following steps.

The edge node initiates a request for acquiring a common identity of a specified radio network information service object to a core network side, and the edge node receives the common identity of the object returned by the core network side, where the radio network information service object includes one or more of the following objects: a user equipment or a traffic flow.

That is, in this embodiment, the core network allows the edge node and the transmission node at node at the radio access network side to mutually identify the object identity.

This embodiment mainly considers that the MEC application, when initiating radio network information services to a specific UE, uses an external identity of the user, such as Mobile Subscriber Integrated Service Digital Network Number (MSISDN), International Mobile Subscriber Identification Number (IMSI), and the like, but the RAN side uses the internal identity of the user in the network such as Radio Network Temporary Identity (RNTI) and the like.

The MEC is connected to the core network through an Nm interface (which is a 5G Ng interface). The MEC initiates a capability exposure request to the core network to acquire core network information, where the request includes specific UE external identities. The core network converts the UE identity of the MEC into UE identity information of the core network, such as Next Generation Application Protocol (AMF NGAP) ID, and sends it to the MEC and the RAN side node, respectively. The MEC uses the AMF NGAP ID to request the UE radio information having the same identity from the RAN side node. The RAN side node, after receiving a capability exposure request carrying this UE identity, transfers UE radio information having this identity to the MEC. In order to reduce the delay, the core network AMF may be sunk to the RAN side.

In a fifth embodiment of the present disclosure, in conjunction with the content of the third and fourth embodiments, the category of the radio information provided by the transmission node at node at the radio access network side for the edge node is mainly illustrated.

It can be known from the third and fourth embodiments that the radio information provided by the transmission node for the edge node may be cell-level or user-level.

If the radio information is the cell-level radio information, the information can be directly transferred between the edge node and the target transmission node through the Xm interface.

If the radio information is the user-level radio information, since the user identity on the target transmission node side is different from the user identity on the edge node side, the core network needs to allocate the same identity such as UE AMF NGAP ID to both the target transmission node and the edge node, and the target transmission node and the edge node perform information transfer under the same user identity.

In this embodiment of the present disclosure, the radio information transferred between the edge node and the target transmission node may be divided into layer 1 information, layer 2 information, and layer 3 information. For example, in the V2X scenario, the application needs to be optimized according to the layer 2 information. The layer 1 is the physical layer, the layer 2 is the packet data convergence protocol (PDCP) layer, the radio link control (RLC) layer, or the medium access control (MAC) layer, and the layer 3 is the radio resource control (RRC) layer.

Optionally, the information transferred between the edge node and the target transmission node may further be divided into static information and dynamic information. The static information may be configuration information, and the dynamic information may be measurement information or performance information. Different information may use different triggering manners. For example, the configuration information may be acquired from a request response sent by the RAN to the MEC, or may be acquired from a response message of the core network to the MEC. The acquisition of the measurement information may be that the RAN periodically sends the radio information to the MEC, or may be that the handover event triggers the RAN to transfer the radio information to the MEC.

Optionally, the radio information transferred between the edge node and the target transmission node may further be divided into identity information, system configuration information, system state information, measurement information, bearer information, and trigger event information according to application requirements. The identity information includes, but is not limited to, network identity, UE identity, base station identity, bearer identity, PDU session identity, service flow identity, and the like. The system configuration information includes, but is not limited to, configuration parameter information such as a cell configuration parameter, window length, and handover threshold. The system status information includes, but is not limited to, time-frequency resource occupancy, user activation status, load indication, packet delay, packet loss rate, scheduling internet protocol (IP) throughput, and the like. The measurement information includes, but is not limited to, reference signal received quality (RSRQ), reference signal received power (RSRP), and channel quality indicator (CQI) reporting. The bearer information includes, but is not limited to, E-RAB, Quality of Service (QoS), Qos classification ID (QCI), maximum bit rate (MBR)/guaranteed bit rate (GBR), S1 bearer-related IP address, tunnel ID. The trigger event includes, but is not limited to, cell access, handover, and the like.

In a sixth embodiment of the present disclosure, an information transmission method is provided. In this embodiment, the information transmission method will be illustrated in more detail by describing the interaction process of the MEC and the RAN node.

The MEC application initiates a radio information call to the mobile edge platform through the radio network information service, and the mobile edge host queries whether the MEC sets up a connection with the target RAN node.

If there is no connection set up, the mobile edge host initiates a connection setup request process. The request message includes connection setup request information, or connection setup request information and radio capability exposure request information. When the request message includes the connection setup request information and the radio capability exposure request information, the content of the request message is specifically one or a combination of the following: a connection setup request, a MEC host ID, a RAN base station ID (or CU ID), a cell ID, a user ID, a category of requesting radio information, a radio information name, a radio information triggering manner, and a radio information response period.

The RAN base station ID (or CU ID) sends a connection setup response message after receiving the connection setup request message. The response message may be connection setup success or connection setup failure. The connection setup success message may include a radio information response, and the content may specifically be one or a combination of the following: connection setup success, a MEC host ID, a RAN base station ID (or CU ID), a cell ID, a user ID, and specific radio information.

If the MEC has set up a connection with the RAN node and the MEC does not send the radio capability exposure request during the process of connection setup, the MEC initiates a radio capability exposure request, and the content of this request is specifically one or a combination of the following: a MEC host ID, a RAN base station ID (or CU ID), a cell ID, a user ID, a category of requested radio information, a radio information name, a radio information triggering manner, and a radio information response period.

The RAN base station ID (or CU ID) sends a radio information response message after receiving the radio capability exposure request. The content of the response message may specifically be one or a combination of the following: a MEC host ID, a RAN base station ID (or CU ID), a cell ID, a user ID, and specific radio information.

If the MEC has set up a connection with the RAN node and the sending manner of some radio information is periodic or an event-triggered manner, the RAN node sends these radio information to the MEC according to triggering conditions, and the content of the message may specifically be one or a combination of the following: a MEC host ID, a RAN base station ID (or CU ID), a cell ID, a user ID, and specific radio information.

Figure 7:
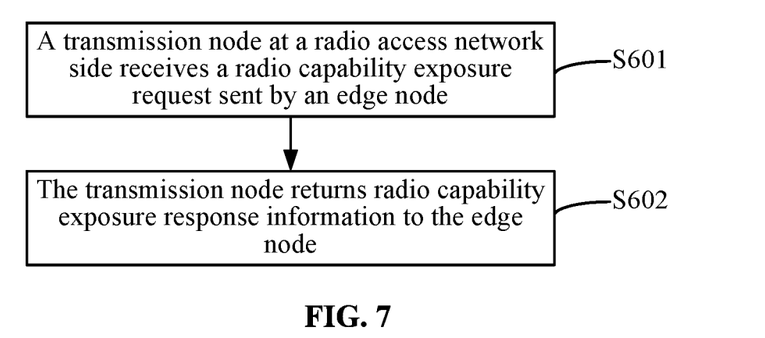
FIG. 7 is a flowchart of an information transmission method according to a seventh embodiment of the present disclosure.

In a seventh embodiment of the present disclosure, an information transmission method is provided. The method is applied to a transmission node at a radio access network side, where the transmission node may be a radio access node or a radio CU, the radio access node may be a conventional or new radio access system base station and transmission node, the convention base station may be a 3GPP base station or an LTE base station, and the new base station may be a 5G base station or a 5G+ base station.

As shown in FIG. 7, the method in this embodiment includes the following steps.

In step S601, a transmission node at a radio access network side receives a radio capability exposure request sent by an edge node.

In step S602, the transmission node returns radio capability exposure response information to the edge node.

In this embodiment, the transmission node returns the radio capability exposure response information through an Xm interface or a UPF.

Optionally, in this embodiment, when the transmission node returns the radio capability exposure response information to the edge node, the transmission node returns the radio capability exposure response information to the edge node after assembling requested radio information by using a manner of control plane message information element (IE) filling or by using a manner of protocol data unit (PDU) multi-layer encapsulation.

Specifically, in order to satisfy all application requirements, there is a lot of information of the layer 1, the layer 2, and the layer 3 that the RAN needs to expose. However, for a certain specific application, there may be little information that needs to be exposed.

One manner is to transparently transmit the information that each layer needs to provide through the control plane and gradually fill the information at each layer by using the message IE. This manner is applicable to scenarios having low delay requirements.

Another manner is to perform layer-by-layer packet encapsulation on information at each layer through the data plane, transfer the information to the MEC, and then unpack the information layer by layer. This manner is applicable to information exposure having low real-time requirements.

The radio information may be sent to the MEC through the Xm interface or may be sent to the MEC through the UPF. It is also an option for a MEC device that has a limited amount of data on the Xm interface or has no Xm interface to pack radio information into a data flow as user plane data and transmit the packed radio information through the UPF that is sunk to the local data network.

Figure 8:
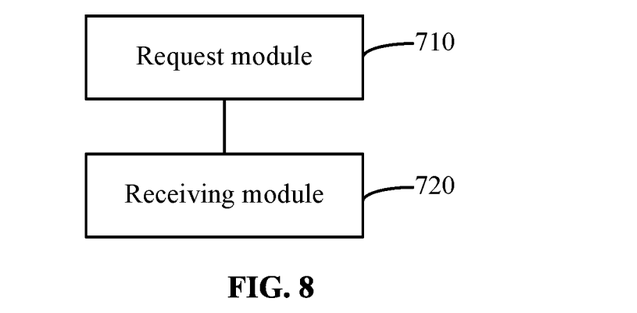
FIG. 8 is a structural diagram of an information transfer apparatus according to an eighth embodiment of the present disclosure.

Corresponding to the method embodiment where the method is applied to the edge node side, in an eighth embodiment of the present disclosure, an information transmission apparatus is provided. The apparatus is applied to the edge node, and as shown in FIG. 8, includes a request module 710 and a receiving module 720.

The request module 710 is configured to send a radio capability exposure request to a target transmission node at a radio access network side.

The receiving module 720 is configured to receive radio capability exposure response information returned by the target transmission node.

Optionally, in this embodiment of the present disclosure, the request module 710 sends the radio capability exposure request to the target transmission node at the radio access network side through an Xm interface.

Optionally, in this embodiment of the present disclosure, the receiving module 720 receives the radio capability exposure response information returned by the target transmission node through an Xm interface or a UPF.

Optionally, in this embodiment of the present disclosure, when the receiving module 720 receives the radio capability exposure response information returned by the target transmission node, the receiving module 720 is further configured to receive the radio capability exposure response information returned by the target transmission node through a REF, where the REF is configured to convert radio information in the received radio capability exposure response information into an information format supported by the edge node.

Optionally, in this embodiment of the present disclosure, the request module 710 is further configured to send a connection setup request to the target transmission node at node at the radio access network side, where the connection setup request includes the radio capability exposure request.

Optionally, in this embodiment of the present disclosure, the radio capability exposure request includes a user-level radio capability exposure request and/or a cell-level radio capability exposure request.

Optionally, in this embodiment of the present disclosure, in response to the radio capability exposure request including the user-level radio capability exposure request, the radio capability exposure request includes one or more of the following information: a mobile edge host ID, a target transmission node ID, a common identity of a radio network information service object, an information category of requested user-level radio information, an information name of requested user-level radio information, a requested user-level radio information response triggering method, or a period of a requested user-level radio information response.

The radio capability exposure response information includes one or more of the following information:

a mobile edge host ID, a target transmission node ID, a common identity of a radio network information service object, an information category of user-level radio information, or user-level radio information.

Optionally, in this embodiment of the present disclosure, the request module 710 is further configured to, before sending the radio capability exposure request to the target transmission node at node at the radio access network side, initiate a request for acquiring a common identity of a specified radio network information service object to a core network side. The receiving module 720 is further configured to receive the common identity of the object returned by the core network side.

The radio network information service object includes one or more of the following objects: a user equipment or a traffic flow.

Optionally, in this embodiment of the present disclosure, in response to the radio capability exposure request including a user-level radio capability exposure request, the radio capability exposure request includes one or more of the following information:

a mobile edge host ID, a target transmission node ID, a cell ID, an information category of requested cell-level radio information, an information name of requested cell-level radio information, a requested cell-level radio information response triggering method, or a period of a requested cell-level radio information response.

The radio capability exposure response information includes one or more of the following information: a mobile edge host ID, a cell ID, an information category of cell-level radio information, of cell-level radio information.

Optionally, in this embodiment of the present disclosure, the information category includes one or more of the following categories: identity information, system configuration information, system state information, measurement information, bearer information, or trigger event information.

Optionally, in this embodiment of the present disclosure, the edge node is a MEC system, a MEC host, or a MEC platform, and the target transmission node is a radio access node or a radio CU.

For implementation details of modules in this embodiment, reference may be made to the description in the method embodiments, and these details will not be repeated in this embodiment.

Through the apparatus in this embodiment, the edge node can directly send the radio capability exposure request to the target transmission node at node at the radio access network side through the Xm interface and receives the radio capability exposure response information without the need for a core network, and the target transmission node can directly send the capability exposure response information to the edge node, thereby solving the problems that a large information transfer delay exists in the radio capability exposure manner and the burden of core network processing is increased in the related art.

Figure 9:
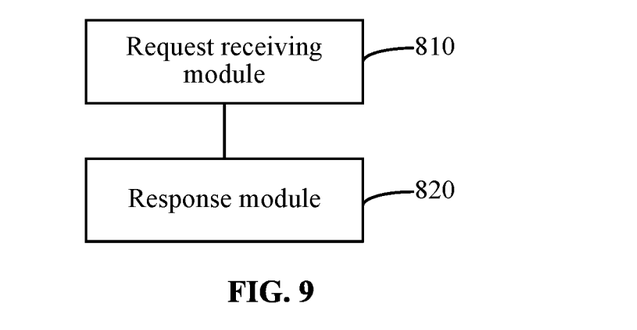
FIG. 9 is a structural diagram of an information transfer apparatus according to a ninth embodiment of the present disclosure.

Corresponding to the method embodiment where the method is applied to the transmission node at node at the radio access network side, in a ninth embodiment of the present disclosure, an information transmission apparatus is provided. The apparatus is applied to the transmission node at node at the radio access network side, and as shown in FIG. 9, includes a request receiving module 810 and a response module 820.

The request receiving module 810 is configured to receive a radio capability exposure request sent by an edge node.

The response module 820 is configured to return radio capability exposure response information to the edge node.

Optionally, in this embodiment of the present disclosure, the response module 820 is specifically configured to return the radio capability exposure response information to the edge node after assembling requested radio information by using a manner of control plane message IE filling or by using a manner of PDU multi-layer encapsulation.

Optionally, in this embodiment of the present disclosure, the response module 820 returns the radio capability exposure response information through an Xm interface or a UPF.

Optionally, in this embodiment of the present disclosure, the edge node is a MEC system, a MEC host, or a MEC platform, and the transmission node is a radio access node or a radio CU.

Through the apparatus in this embodiment, the edge node can directly send the radio capability exposure request to the target transmission node at node at the radio access network side, and the target transmission node can also directly send the capability exposure response information to the edge node without the need for a core network, thereby solving the problems that a large information transfer delay exists in a radio capability exposure manner and the burden of core network processing is increased in the related art.

Figure 10:
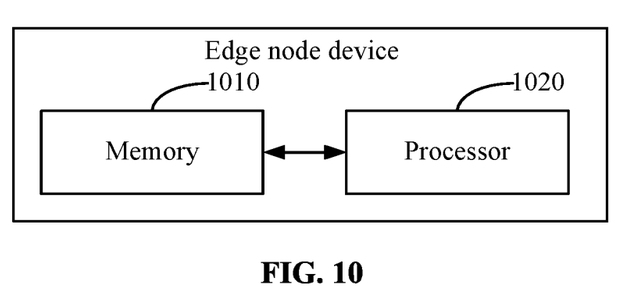
FIG. 10 is a structural diagram of an edge node device according to a tenth embodiment of the present disclosure.

In a tenth embodiment of the present disclosure, an edge node device is provided. As shown in FIG. 10, the edge node device includes a memory 1010, a processor 1020, and a computer program stored in the memory 1010 and executable by the processor 1020, where the computer program, when executed by the processor 1020, implements the method steps described below.

A radio capability exposure request is sent to a target transmission node at a radio access network side.

Radio capability exposure response information returned by the target transmission node is received.

In an optional embodiment of the present disclosure, the edge node device sends the radio capability exposure request to the target transmission node at node at the radio access network side through an Xm interface.

In an optional embodiment of the present disclosure, the edge node device receives the radio capability exposure response information returned by the target transmission node through an Xm interface or a UPF.

In this embodiment of the present disclosure, the manner in which the edge node device receives the radio capability exposure response information returned by the target transmission node includes the following manners.

In manner one, the edge node device receives the radio capability exposure response information returned by the target transmission node through a radio capability exposure network element (REF), where the REF is configured to convert radio information in the received radio capability exposure response information into an information format supported by the edge node.

In manner two, the edge node device receives the radio capability exposure response information returned by the target transmission node through a UPF.

In this embodiment of the present disclosure, the radio capability exposure request includes a user-level radio capability exposure request and a cell-level radio capability exposure request. For the specific embodiment process, reference may be made to the third and fourth embodiments. The specific embodiment process will not be repeated in this embodiment.

For the implementation process of the above steps, reference may be made to the method embodiment applied on the edge node side, and the implementation process will not be repeated in this embodiment.

In an eleventh embodiment of the present disclosure, a computer-readable storage medium is provided. The computer-readable storage medium is configured to store an implementation program of information transmission. When executed by a processor 1020, the program implements the method steps described below.

A radio capability exposure request is sent to a target transmission node at a radio access network side.

Radio capability exposure response information returned by the target transmission node is received.

For the implementation process of the above steps, reference may be made to the method embodiment applied on the edge node side, and the implementation process will not be repeated in this embodiment.

Figure 11:
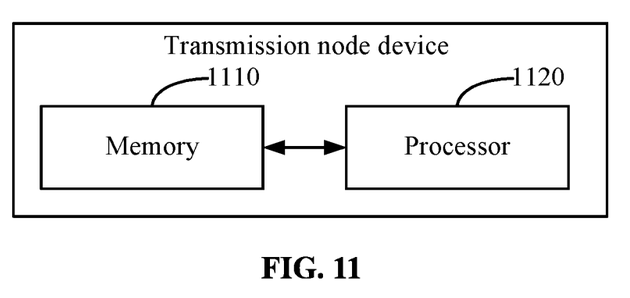
FIG. 11 is a structural diagram of a transmission node device according to a twelfth embodiment of the present disclosure.

In a twelfth embodiment of the present disclosure, a transmission node device is provided. As shown in FIG. 11, the transmission node device includes a memory 1110, a processor 1120, and a computer program stored in the memory 1110 and executable by the processor 1120, where the computer program, when executed by the processor 1120, implements the method steps described below.

A radio capability exposure request sent by an edge node is received.

Radio capability exposure response information is returned to the edge node.

In this embodiment, the transmission node device returns the radio capability exposure response information through an Xm interface or a UPF.

Optionally, in this embodiment, when the transmission node device returns the radio capability exposure response information to the edge node, the transmission node device returns the radio capability exposure response information to the edge node after assembling requested radio information by using a manner of control plane message IE filling or by using a manner of PDU multi-layer encapsulation. For the implementation process of the above steps, reference may be made to the method embodiment applied on the transmission node side of the radio access network side, and the implementation process will not be repeated in this embodiment.

In a thirteen embodiment of the present disclosure, a computer-readable storage medium is provided. The computer-readable storage medium is configured to store an implementation program of information transmission. When executed by a processor 1120, the program implements the method steps described below.

A radio capability exposure request sent by an edge node is received.

Radio capability exposure response information is returned to the edge node.

For the implementation process of the above steps, reference may be made to the method embodiment applied on the transmission node side of the radio access network side, and the implementation process will not be repeated in this embodiment.

The computer-readable storage medium in this embodiment includes, but is not limit to, a read-only medium (ROM), a random access medium (RAM), a magnetic disk, an optical disk, and the like.

Apparently, it is to be understood by those skilled in the art that the modules or steps of the present disclosure may be implemented by a general-purpose computing apparatus and may be concentrated on a single computing apparatus or distributed in a network formed by multiple computing apparatuses. Optionally, these modules or steps may be implemented by program codes executable by the computing apparatus. Thus, these modules or steps may be stored in a storage apparatus and executed by the computing apparatus. Moreover, in some cases, the illustrated or described steps may be executed in a sequence different from the sequence described herein. Alternatively, each of these modules or steps may be implemented by being made into an integrated circuit module or multiple modules or steps among these modules or steps may be implemented by being made into a single integrated circuit module. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure fall within the scope of the present disclosure.

The invention claimed is:

1. An information transmission method, comprising:
    sending, by a mobile edge computing, MEC, system, a radio capability exposure request to a radio access node at a radio access network side; and
    receiving, by the MEC system, radio capability exposure response information returned by the radio access node;
    wherein the MEC system receives the radio capability exposure response information returned by the radio access node through an Xm interface, wherein the Xm interface is configured to connect the radio access node and the MEC system;
    wherein in response to the MEC system receiving the radio capability exposure response information returned by the radio access node, the method further comprises:
    receiving, by the MEC system, the radio capability exposure response information returned by the radio access node through a radio capability exposure network element, wherein the radio capability exposure network element is configured to convert radio information in the received radio capability exposure response information into an information format supported by the MEC system.

2. The method of claim 1, wherein the MEC system sends the radio capability exposure request to the radio access node at the radio access network side through an Xm interface.

3. The method of claim 1, wherein the sending, by the MEC system, the radio capability exposure request to the radio access node at the radio access network side comprises:
    sending, by the MEC system, a connection setup request to the radio access node at the radio access network side, the connection setup request comprising the radio capability exposure request.

4. A mobile edge computing, MEC, system, comprising a memory, a processor, and a computer program stored in the memory and executable by the processor, wherein the processor, when executing the computer program, implements steps of the information transmission method of claim 1.

5. A non-transitory computer-readable storage medium storing a program for implementing information transfer, wherein the program, when executed by a processor, implements steps of the information transmission method of claim 1.

6. The method of claim 1, wherein the radio capability exposure request comprises a user-level radio capability exposure request and/or a cell-level radio capability exposure request.

7. The method of claim 6, wherein in response to the radio capability exposure request comprising the cell-level radio capability exposure request, the radio capability exposure request comprises one or more of the following information:
    a mobile edge host ID, a radio access node ID, a cell ID, an information category of requested cell-level radio information, an information name of requested cell-level radio information, a requested cell-level radio information response triggering method, or a period of a requested cell-level radio information response; and the radio capability exposure response information comprises at least one of the following information:

a mobile edge host ID, a cell ID, an information category of cell-level radio information, or cell-level radio information.

8. The method of claim 6, wherein in response to the radio capability exposure request comprising the user-level radio capability exposure request, the radio capability exposure request comprises one or more of the following information:

a mobile edge host identity (ID), a radio access node ID, a common identity of a radio network information service object, an information category of requested user-level radio information, an information name of requested user-level radio information, a requested user-level radio information response triggering method, or a period of a requested user-level radio information response; and the radio capability exposure response information comprises at least one of the following information:

a mobile edge host ID, a radio access node ID, a common identity of a radio network information service object, an information category of user-level radio information, or user-level radio information.

9. The method of claim 8, wherein before the sending, by the MEC system, the radio capability exposure request to the radio access node at the radio access network side, the method further comprises:

initiating, by the MEC system, a request for acquiring a common identity of a specified radio network information service object to a core network side; and receiving, by the MEC system, the common identity of the object returned by the core network side.

10. The method of claim 9, wherein the radio network information service object comprises at least one of the following objects: a user equipment or a traffic flow.

11. The method of claim 8, wherein the radio network information service object comprises at least one of the following objects: a user equipment or a traffic flow.

12. The method of claim 8, wherein the information category comprises one or more of the following categories: identity information, system configuration information, system state information, measurement information, bearer information, or trigger event information.

13. The method of claim 8, wherein the radio information response triggering method comprises: triggering an information response transferred by radio information in a form of subscription or notification.

14. An information transmission method, comprising:

sending, by a radio access node at a radio access network side, a radio capability exposure request sent by an MEC system; and returning, by the radio access node, radio capability exposure response information to the MEC system;

wherein the radio access node returns the radio capability exposure response information through an Xm interface, wherein the Xm interface is configured to connect the radio access node and the MEC system;

wherein in response to the MEC system receiving the radio capability exposure response information returned by the radio access node, the method further comprises:

receiving, by the MEC system, the radio capability exposure response information returned by the radio access node through a radio capability exposure network element, wherein the radio capability exposure network element is configured to convert radio information in the received radio capability exposure response information into an information format supported by the MEC system.

15. The method of claim 14, wherein the returning, by the radio access node, the radio capability exposure response information to the MEC system comprises:

returning, by the radio access node, the radio capability exposure response information to the MEC system after assembling requested radio information by using a manner of control plane message information element (IE) filling or by using a manner of protocol data unit (PDU) multi-layer encapsulation.

16. A radio access node device, comprising a memory, a processor, and a computer program stored in the memory and executable by the processor, wherein the processor, when executing the computer program, implements steps of the information transmission method of claim 14.

17. A non-transitory computer-readable storage medium storing a program for implementing information transfer, wherein the program, when executed by a processor, implements steps of the information transmission method of claim 14.

* * * * *